Figure 1:
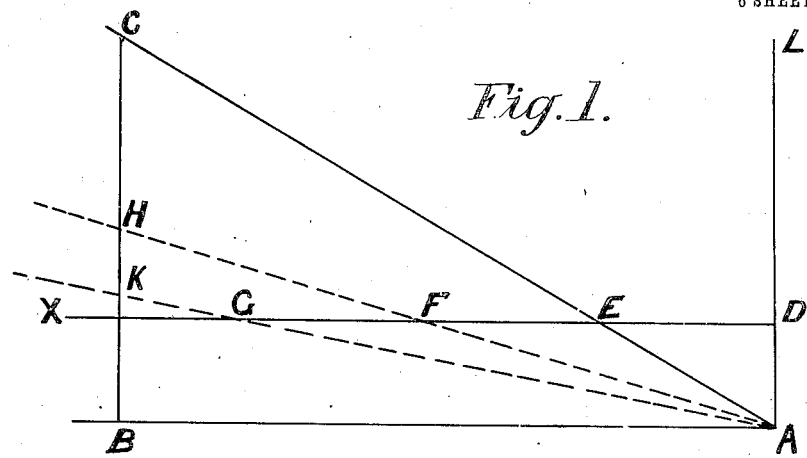

No. 895,968.

PATENTED AUG. 11, 1908.

H. R. COOK.

PHOTOGRAPHIC ENLARGING OR REDUCING APPARATUS.

APPLICATION FILED APR. 1, 1905.

6 SHEETS—SHEET 1.

No. 895,968. PATENTED AUG. 11, 1908.
H. R. COOK.
PHOTOGRAPHIC ENLARGING OR REDUCING APPARATUS.
APPLICATION FILED APR. 1, 1905.

6 SHEETS—SHEET 3.

No. 895,968. PATENTED AUG. 11, 1908.
H. R. COOK.
PHOTOGRAPHIC ENLARGING OR REDUCING APPARATUS.
APPLICATION FILED APR. 1, 1905.
6 SHEETS—SHEET 4.

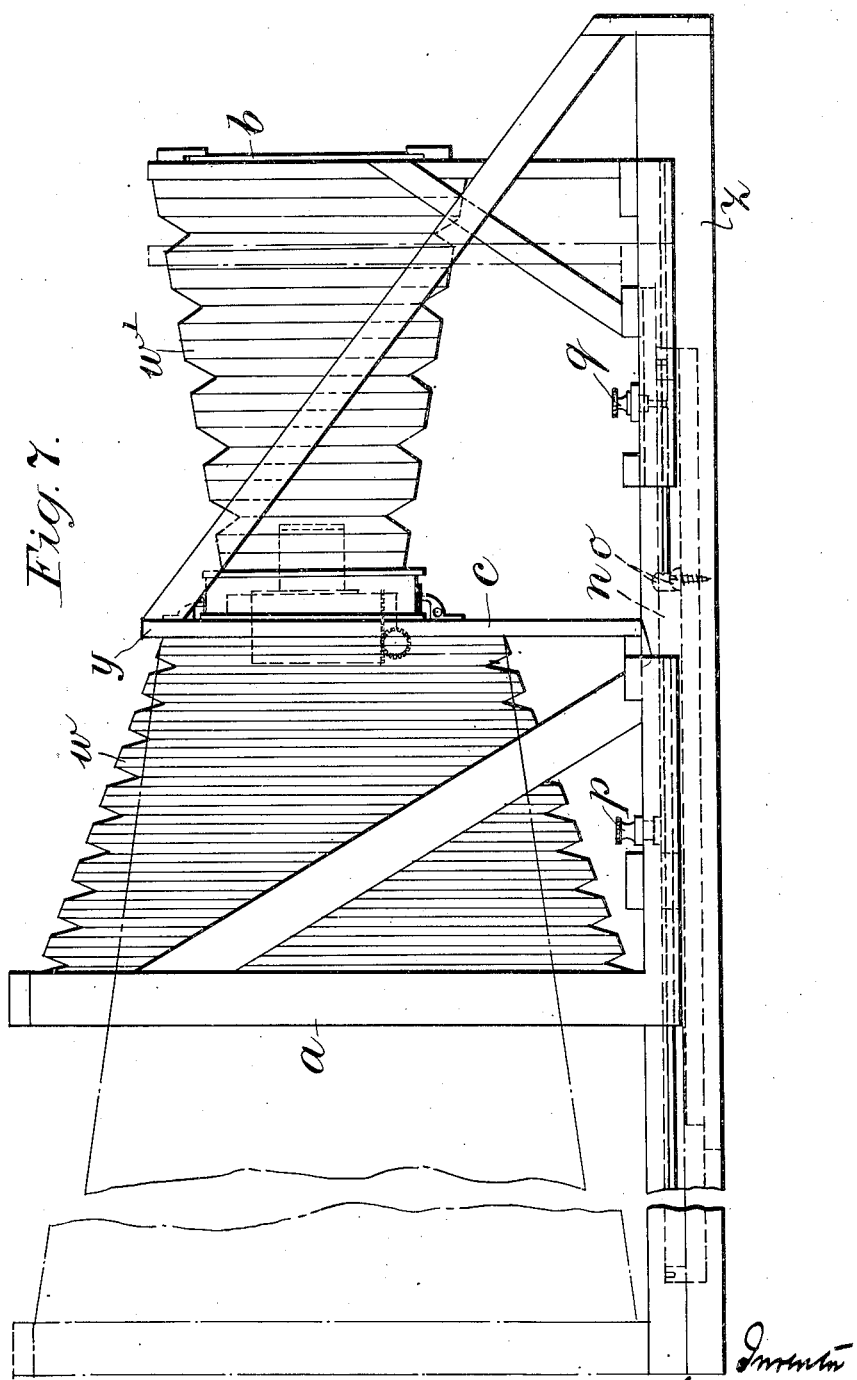

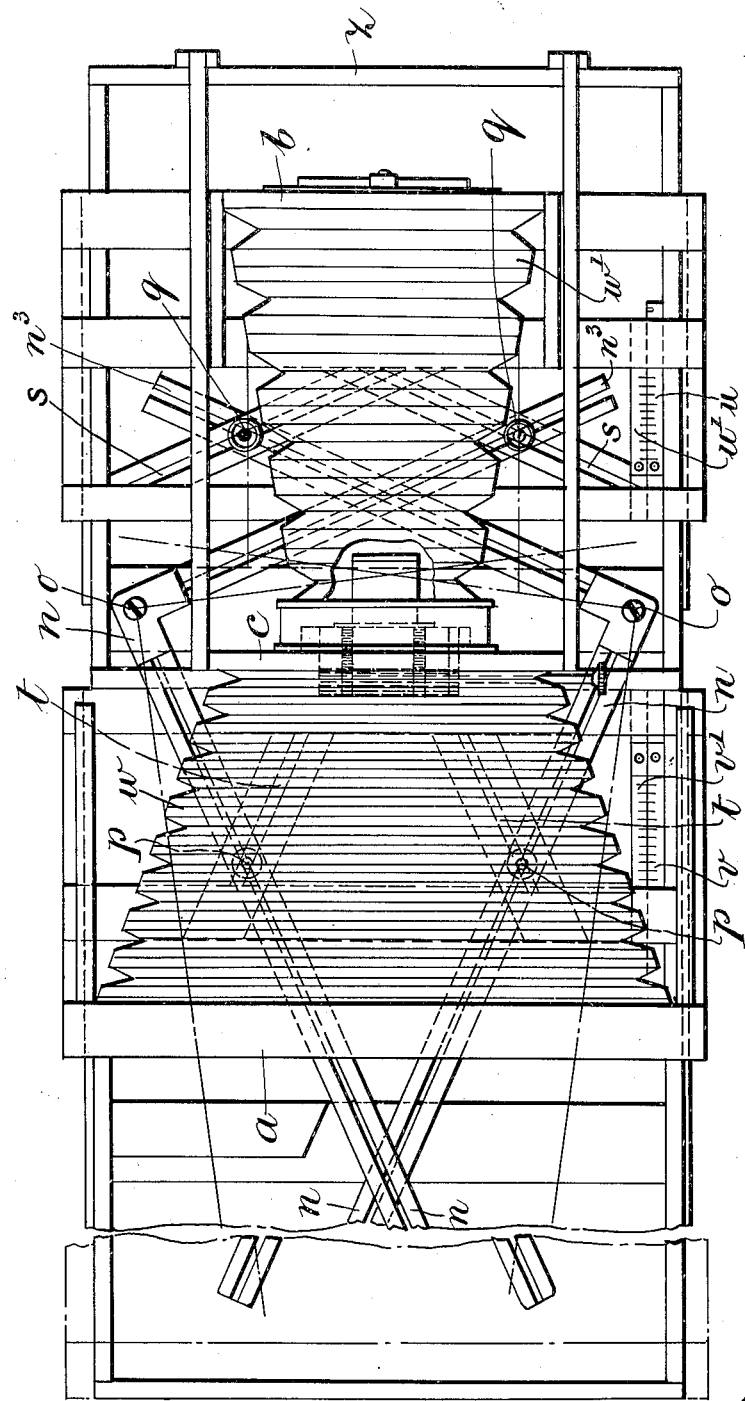

UNITED STATES PATENT OFFICE.

HENRY REX COOK, OF FAREHAM, ENGLAND.

PHOTOGRAPHIC ENLARGING OR REDUCING APPARATUS.

No. 895,968.   Specification of Letters Patent.   Patented Aug. 11, 1908.

Application filed April 1, 1905. Serial No. 253,336.

*To all whom it may concern:*

Be it known that I, HENRY REX COOK, major in the Royal Garrison Artillery, a subject of the King of Great Britain, residing at Fort Fareham, Fareham, in the county of Hants, England, have invented certain new and useful Improvements in Photographic Enlarging or Reducing Apparatus, of which the following is a specification.

This invention relates to photographic enlarging or reducing apparatus of the type in which the distance between the various parts carrying the lens the negative and the positive is adjustable. In this general type of apparatus either one of the three components carrying respectively the positive, the lens, or the negative, may be fixed in relation to the base-board and the other two movable; and the relative distances between the lens and the negative to be copied and that between the lens and the positive to be made, must be adjusted according to the focus of the lens in use and the degree of enlargement or reduction desired. For the sake of simplicity these distances will be called hereinafter the "front focus" and "back focus" respectively.

Now the object of this invention is to enable the front focus and back focus to be automatically and at the same time truly adjusted simultaneously with the adjustment of the apparatus so that whatever degree of enlargement or reduction within certain practical limits, may be desired, the various components will be correctly placed relatively to one another without thought or calculation on the part of the operator; whereby I am enabled to provide an apparatus so that whatever size of picture is desired, it is only necessary to place either the enlargement carrier or the lens carrier in position and by a lever or system of levers accurate focus is obtained without calculation or visual effort on the part of the operator.

As is well-known, when an enlargement requires to be made, the length of the back focus may be expressed by the formula $$"f + (f \times n)"$$

where "$f$" = the equivalent focus of the lens, and "$n$" = the factor of enlargement. And in the same way, the length of the front focus may be expressed by $$"f + (f \div n)".$$

That is to say for every additional unit of enlargement the back focus increases by a fixed increment and the front focus diminishes by a constantly decreasing amount. Now if a lever be pivoted at one end of a given base, and inclined so as to form the hypotenuse of a right angled triangle of which the remaining side is equal to the equivalent focus of the lens, it can be shown that the uniform movement of a point acting against the lever, along a line parallel to the base, will depress the lever so that it cuts the side of the triangle in a constantly diminishing ratio. And similarly a right-angled lever may be pivoted at one end of the base, so that the latter intersects the angle between the arms of the lever, then if one arm of the lever be inclined so as to form the hypotenuse of a right-angled triangle as before and the remaining side be made equal to the equivalent focus of the lens, it can be shown that the uniform movement of a point acting on the other arm of the lever, along a line at right angles to the base, will cause the lever to move a constantly decreasing distance along the side of the triangle. In both cases, in order that the uniform movement of the actuating point, which should correspond to that of the back focus, may cause the decreasing rate of movement of the lever along the side of the triangle to correspond to that of the front focus, it is necessary that the distance traveled by the point for each unit of magnification, should be, to the distance of its path from the pivot of the lever, as the length of the base is to the focus of the lens—or this ratio may be expressed as = the co-tangent of the angle made by the lever with the base in the first position. This relation may be expressed in different terms in the following manner:—$R \times \cos. \theta = f \times n$, where R equals the length of the lever and $\theta$ the angle of inclination of the lever to the axis of the lens. The "ratio" of enlargement being for each carrier the relative size of its picture to that of the other.

In order to embody the above principle in an enlarging apparatus, according to this invention, the distance of the negative carrier from the lens is adjusted by means of a lever or levers movable in a plane at right angles to the planes of the opposite surfaces of the positive and negative and suitably inclined to the planes of the latter. Said lever or levers may be attached to the negative carrier in any suitable manner, but preferably by a pin or stud which passes through a longitudinal slot in each said lever. By altering the angle of inclination of this lever (or levers) the negative carrier tends to move along the base-board of the apparatus at right angles to its own plane. The inclination of the lever may be effected by the movement of the lens carrier, or alternatively by the movement of the positive carrier along the base-board. For this purpose the lever may be straight and pivoted to the lens carrier; and a pin or feather may work against the lever in such a manner that when the pin or feather is moved transversely in relation to the lever the inclination of the latter is altered.

As an alternative method the pin or feather may be fixed to a bush or cursor traveling on a screw cut on a shaft which carries a pinion, which may be used in the usual manner in combination with a rack, to move the lens carrier along the base-board. This pin or feather may work against the lever in any suitable manner, as for instance in a groove or slot in the lever. Or again, in place of a straight lever pivoted to the lens carrier, a lever rigidly bent at right angles may be used. This bent lever may be pivoted either to the lens carrier or to the base-board of the apparatus, and one arm may be attached to the negative carrier by a pin or stud passing through a slot in the arm of the lever.

Working against the other arm of the lever may be a pin or stud fixed to the base-board or to the positive carrier, so that when the lens carrier or the positive carrier is moved along the base-board the angle of inclination of the lever is altered.

In place of one lever, in every case a pair of similar levers may be used in combination and arranged to correspondingly act in conjunction with one another; and the levers and pins may be fixed in or near the plane of the base-board, or alternatively if desired may be attached or arranged on the sides or top of the apparatus. And in order that my present invention may be the more easily understood and readily carried into practice I will proceed to further describe same with reference to the drawings hereunto annexed.

Figure 2:
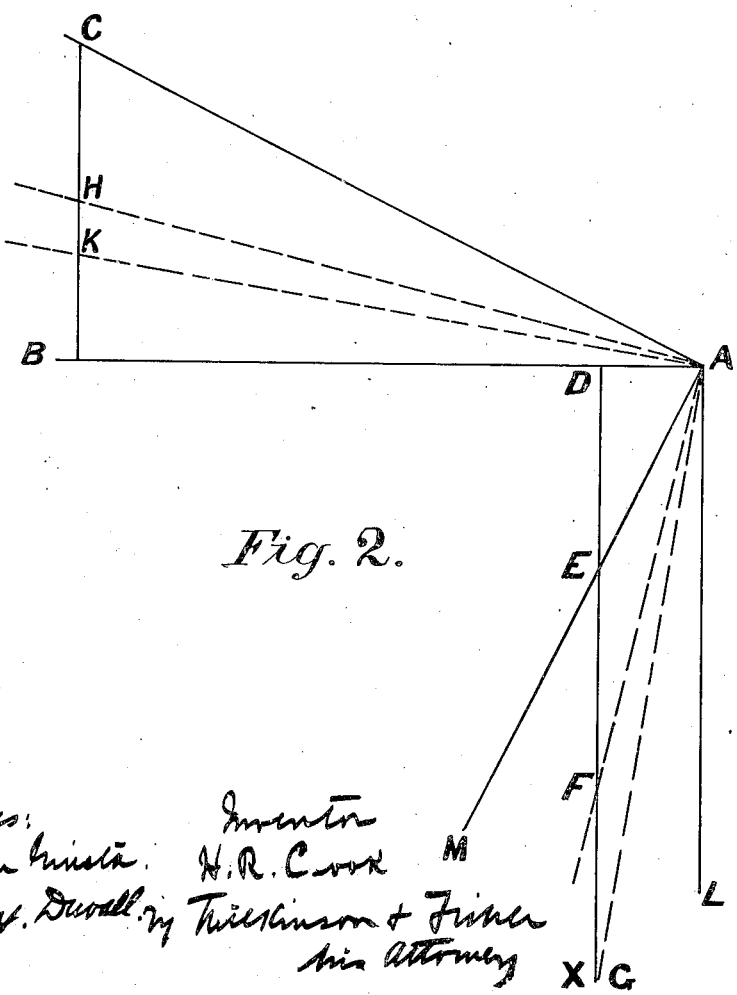
Figure 3:
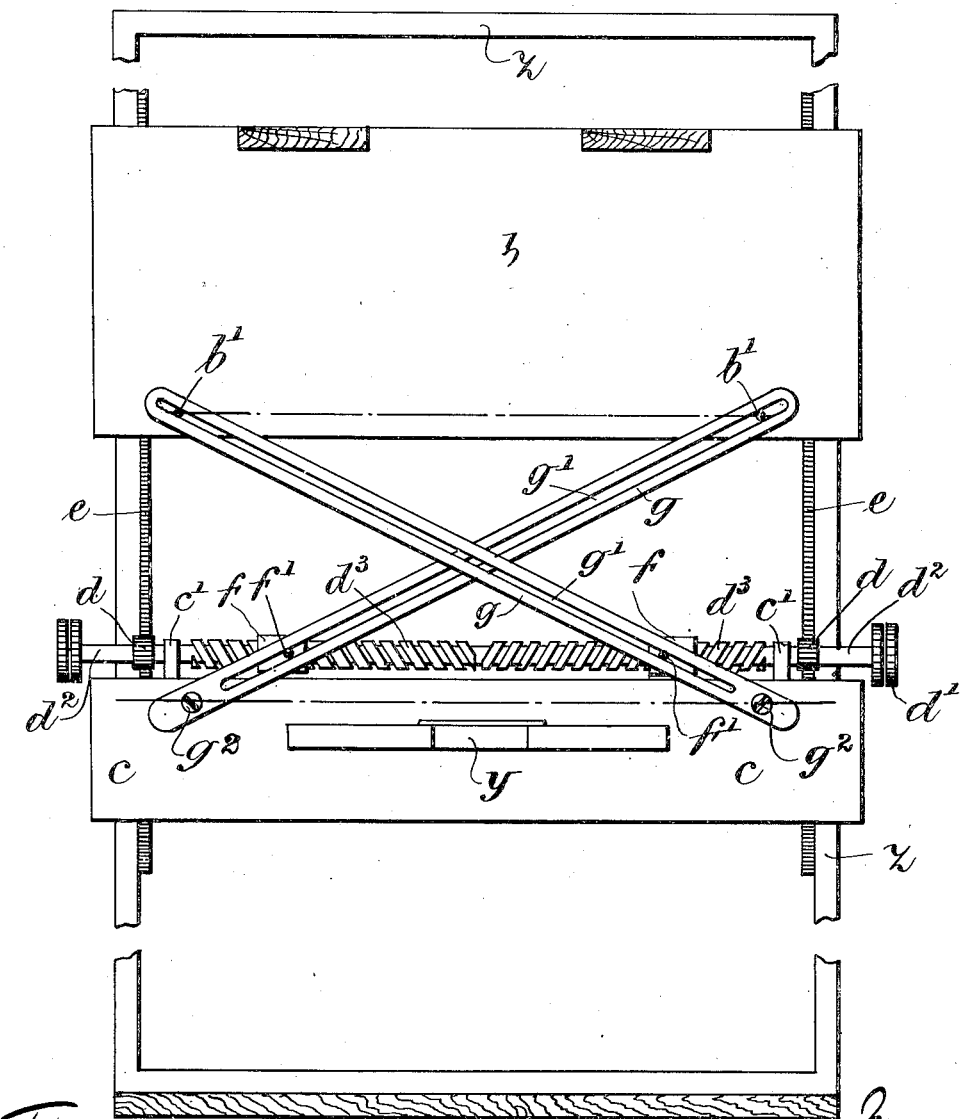
Figure 4:
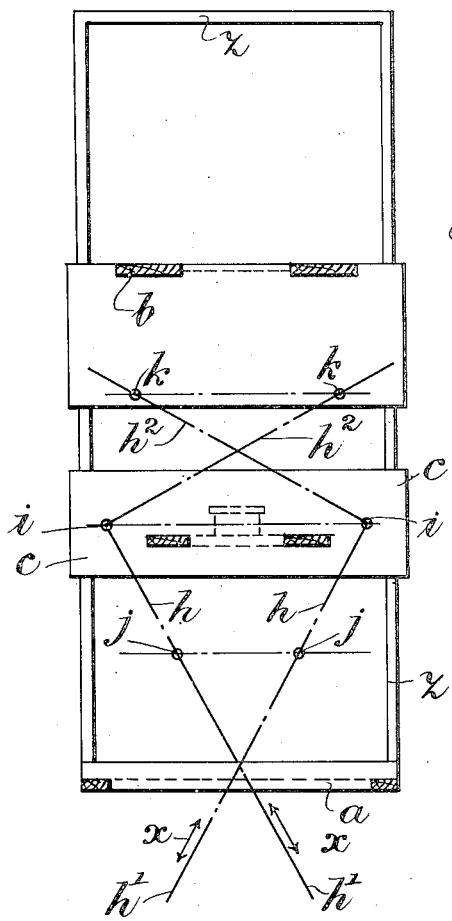
Figure 5:
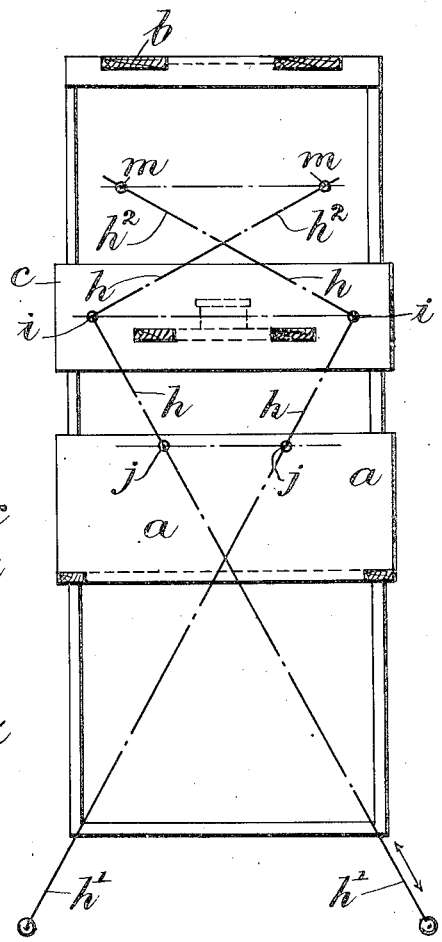
Figure 6:
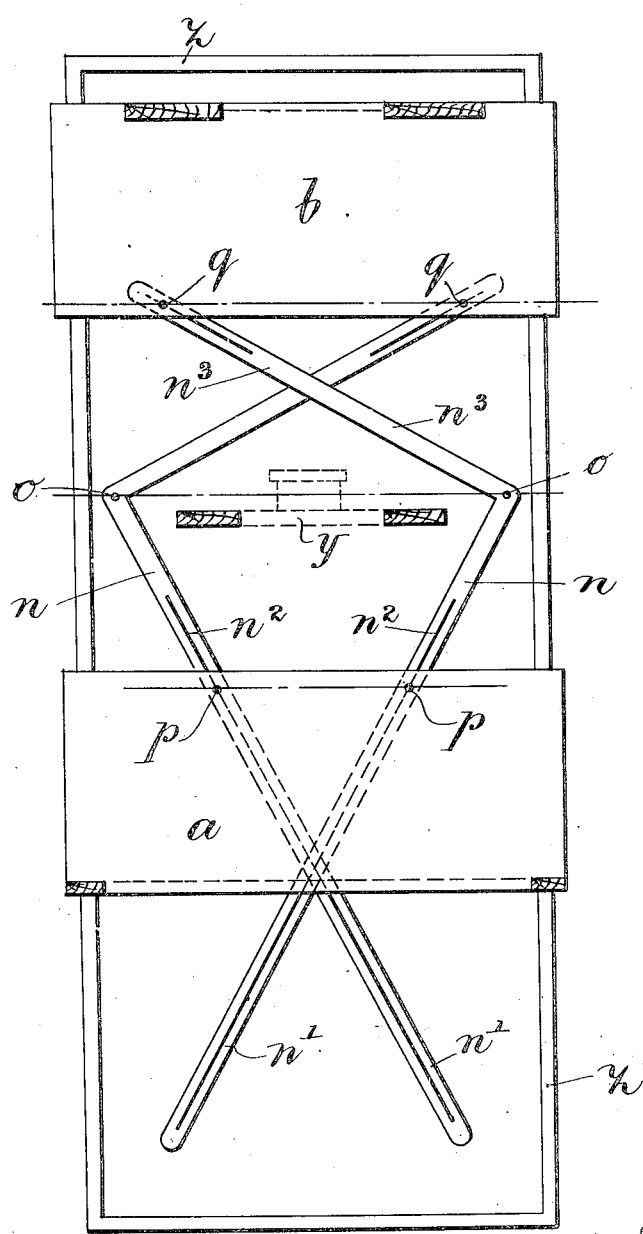

Figures 1 and 2 are geometrical diagrams, illustrating the mathematical theorem which I employ in carrying out my present invention as herein explained. Fig. 3 is a plan in diagrammatic form of an enlarging or reducing apparatus showing one method of carrying my present invention into practice. Figs. 4 and 5 are similar plan views (each on a smaller scale) showing two alternative methods of carrying out my present invention. Fig. 6 is a plan view (on a larger scale than Figs. 4 and 5) of an enlarging or reducing apparatus showing another method of carrying out my present invention; this last-named method having the advantage of being very simple and inexpensive in its application and manufacture, and the lens carrier in this case is fixed—this being advantageous in order to insure absolute accuracy. Fig. 7 is a side elevation and Fig. 8 a plan view (both on a considerably larger scale than the other figures) showing the complete enlarging or reducing apparatus and in which the method of automatically adjusting same as illustrated in Fig. 6 is employed.

To fully explain the mathematical theorem involved reference should be made to Fig. 1 in which A C is a lever pivoted to the point A in the base A B forming the hypotenuse of a right-angled triangle A B C in which the remaining side B C is equivalent to the focal length of the lens.

From a point D in a line A L normal to the base A B, a line D X is drawn parallel to the line A B cutting the line A C at the point E. If the line D X be now divided at the points F and G so that E F, F G, are each equal to D E it will be seen that if the line (lever) A C be depressed until it cuts the line D X at F it will exactly bisect the side B C; similarly if depressed until it cuts the line D X at G it will divide B C at K, and B K is one-third of B C. Thus it will be seen that if the intersection of the lever A C with the line D X be at a point distant (D E × $n$) from the point D, then the intersection of the lever A C with the side B C will be at a distance from B equal to B C ÷ $n$.

In Fig. 2; C, A, M, represents a right-angled lever pivoted at the point A in the base A B.

A C forms the hypotenuse of a right-angled triangle A B C, in which the side B C is equal to the equivalent focus of the lens; now if D X be drawn at right angles to A B cutting the other arm of the lever A M at E, and if E F be made equal to D E, and if D X be divided at F and G so that E F, F G, are each equal to D E, then if the arm of the lever A M be moved so as to intersect the line D X at F the other arm A C of the lever will bisect the line B C at H. And as before, if the long arm of the lever intersects the line D X at a point ($n$ × D E) distant from D, then the short arm of the lever will intersect B C at a point (B C ÷ $n$) distant from B. That is to say, if D E be made equal to $f$, the equivalent focus of the lens, then as the position of the lever along the line D X varies as $n$ × D E, or as $n$ × $f$, the position of the lever along the line B C varies as B C ÷ $n$, or as $f$ ÷ $n$, which satisfies the formulæ for the lengths of the front and back foci. Similarly if the arm A M be moved to intersect the line D X at the point G, the arm A C would then intersect the line B C at K, and B K is one-third of B C.

In applying the foregoing theorem to photographic enlarging or reducing apparatus, according to this invention I proceed as follows:—In an apparatus constructed on the model of Fig. 1:—I cause a point to move along the line D X the said point moving by gearing or otherwise in direct proportion with the movement of the lens carrier) towards or away from the positive carrier) along the base-board so that a uniform movement of the lens carrier causes a varying motion of the lever connecting the lens carrier with the negative carrier.

In an apparatus constructed on the model of Fig. 2; I cause a point E fixed to the base of the positive carrier to act on the arm of the lever A M so that when the distance of the point E on the positive carrier is varied from the pivot A of the lever, and the positive carrier is thereby altered, the other arm of the lever causes a varying motion of the lever A C connecting the lens carrier with the negative carrier.

In one form of carrying this invention into practice as illustrated in Fig. 3 I have shown the positive carrier $a$ fixed to the base-board or frame $z$ along which both the negative carrier $b$ and the lens carrier $c$ respectively are moved as follows:—$d\ d$ are pinions adapted to be rotated along the racks $e$ by the milled heads $d^1$ on the shaft $d^2$ which latter is journaled in bearings $c^1$ attached to the lens carrier $c$, and this shaft $d^2$ is provided with right and left-handed screw-threads $d^3\ d^3$ thereon upon each of which latter respectively is mounted an internally screw-threaded sleeve bush or cursor $f$ each of which latter is provided with a pin $f^1$ located in or operating in the slot $g^1$ of each of the slotted levers $g$ each of which latter is respectively pivoted at $g^2$ to the movable lens carrier $c$. $b^1\ b^1$ are pins fixed on the negative carrier and located in and operating on the aforesaid slotted levers $g\ g^1$.

At "unity" (that is when the two pictures on the negative and positive are of the same size) the distance of an imaginary line connecting the pivot points $b^1$ on the negative carrier from an imaginary line connecting the points $g^2$ on the lens carrier $c$ will thus be equal to the equivalent focus of the lens while the pitch of the right and left handed screw $d^3$, and the diameter of the pinion $d$, and the distance of the axial line of said shaft $d$ from the imaginary line connecting the centers $g^2$ must be such as to produce the relative movement of the lens carrier $c$ and the negative carrier as hereinbefore defined with reference to Fig. 1.

The position of the optical center of each lens depending on the character of the latter such position is a factor which must of course be taken into consideration in all cases in constructing this apparatus.

In Fig. 4 the positive carrier $a$ is fixed and the negative carrier $b$ and lens carrier $c$ are movable as in Fig. 3; in the arrangement shown in Fig. 4 however the mechanism employed consists of two right-angled levers $h$ respectively pivoted at $i$ to the movable lens carrier $c$ the longer arm $h^1$ of each said lever either being adapted to slide freely through a swivel eye at the point $j$, where it is fixed to the base board, and thus connected to the carrier $a$ which is also fixed to the base board, or said arms $h^1$ may be slotted so as to be adapted to slide over a fixed pin or stud at $j$; while the other end $h^2$ of each said lever is attached at the point $k$ to or otherwise arranged to act at the point $k$ on the movable negative carrier $b$, such connection at $k$ being effected by means of a stud engaging in a slot in the lever arms $h^2$ or the latter may pass through a swivel eye—or other similar or equivalent devices may be employed.

To adjust the apparatus; the operator moves the carriers direct or pushes or pulls the ends of the levers $h$ in the direction of the double-ended arrows $x$, so that as the levers are forced past the points $j\ j$ of attachment or connection to the positive carrier $a$ consequently each rectangular lever is rocked on its pivot $i$, and thereby the outer end $h^2$ of each lever moves the negative carrier $b$, and the desired relative movement is thereby imparted to the lens carrier $c$ and the negative carrier $b$—both relatively to one another and to the positive carrier.

In Fig. 5; an arrangement of levers $h\ h$ is shown somewhat similar to Fig. 4, said levers being pivoted at $i$ to the lens carrier $c$; but in this case the positive carrier $a$ is made movable and has the levers $h$ attached or connected thereto at $j$ in a similar manner to that described with reference to the point of attachment at $j$ of said levers $h$ in Fig. 4; while the other ends $h^2$ of said levers are similarly attached at $m$ (as at $j$) to the base $z$ or the negative holder $b$ which latter in this arrangement is fixed.

In Figs. 6 to 8 the lens carrier $y$ is fixed to the base $z$ and the right-angled levers $n$ are pivoted at $o$ to the base—the dotted line shown connecting the two pivot points $o$ in Fig. 6 being advantageously (but not necessarily) in the same vertical plane as the optical center of the lens provided in said fixed lens carrier $y$; the arm $n^1$ of each lever $n$ is slotted at $n^2$; and a fixed pin or stud etc. $p$ carried on the positive carrier $a$ engages in said slot $n^2$; or said arms $n^1$ instead of being slotted may slide through a swivel eye at the point $p$; and similarly the arm $n^3$ of each lever $n$ is attached or connected at the point $q$ to the movable negative carrier $b$.

The distance of the points of attachment or connection at $q\ q$ of the levers $n$ to the movable negative carrier $b$ from the imaginary line through the pivot points $o\ o$, and the distance of the points of attachment or connection at $p\ p$ of the levers $n$ to the movable positive carrier $a$ from said imaginary line between the points $o$, must each be equal to the equivalent focus of the lens when the parts are at unity—that is when the two pictures are of the same size; and by sliding either the carrier $a$ or $b$ along the base $z$ either towards or away from the fixed lens carrier $y$ by means of said levers $n$ connecting as aforesaid the said two movable carriers, the latter will be differentially moved in the proper ratio to produce automatic focusing for enlarging or reducing purposes.

If desired the adjustment of the carriers $a$ and $b$ Fig. 6 (or adjustment of the other movable parts as in Figs. 4 and 5) may be effected by the operator grasping the ends $n^1$ of the levers $h$ (or ends $h^1$ of the levers $h$) and by forcing said two ends towards or away from one another, the aforesaid component parts of the apparatus can be automatically set in focus to enlarge or reduce to any desired extent within the limits of the apparatus—which in the example shown in Fig. 6 would amount to about three magnifications. For the purpose of thus utilizing the levers $n$ or $h$ to operate the apparatus, said levers may be prolonged so as to extend to any desired point beyond the apparatus; and each lever may be provided with a knob handle or other mechanism or attachments for the purpose of operating same.

Comparing Fig. 6 with Fig. 2, the short arm of the lever $n^3$ corresponds with A C. The long arm $n^1$ corresponds with A M. The pivot $o$ corresponds with A, and the line $o o$ corresponds with the line A B. The point of attachment $p$ corresponds with the intersection of A M with D X, and the point $q$ corresponds with the point C. The distance between the lines $o o$ and $q q$ corresponds with the distance B C (which is equal to the equivalent focus of the lens), and the distance between the lines $p p$ and $o o$ also corresponds with the distance D E which causes the line B C to equal the equivalent focus of the lens. The point $p$ being fixed in the carrier $a$ moves along a path parallel to the sides of the base board, and at right angles to the line $o o$. The said path of the point $p$, therefore, corresponds with the line D X, Fig. 2. Similarly the point $q$ being fixed in the negative carrier $b$ (which is movable along the base board $z$) its path corresponds to the line B C. Hence as positive carrier $a$ is moved along the base board, the distance of the point $p$ from the line $o o$ varies as $f \times n$, and the distance of the point $q$ from the line $o o$ will vary as $f \div n$, which satisfies the formulæ for the lengths of the front and back foci.

In Figs. 7 and 8 the positive carrier $a$ and the negative carrier $b$ are shown at about "unity" position and attached to the lens carrier $c$ by means of the ordinary or any suitable bellows $w$ $w^1$ the latter i. e. the bellows attaching the negative holder to the lens carrier being advantageously arranged in any suitable manner so as to be readily detachable from the lens carrier to thereby permit access to the lens. Means are also advantageously provided to enable said lens to be changed, and to adjust the position of said lens (i. e. the optical center) relatively to its carrier $c$; for example the lens may be mounted in a movable housing adapted to be moved longitudinally by a rack and pinion motion—as indicated in the drawings; or, obviously such lens may be mounted and adjusted if desired in any other suitable manner.

When required, for the purpose of enabling different lenses i. e. lenses of different focal length to be employed in this apparatus, I provide means to vary the respective points of attachment at $q$ and $p$ of the levers $n$ to the carriers $a$ $b$, so as to compensate for variation of the focal length in different lenses and so that when this adjustment has been obtained the parts can then be all secured relatively to one another in such a manner that the automatic adjustment of the focus of the apparatus for different enlargements or reductions will then take place as before.

The means illustrated in Figs. 7 and 8 for obtaining the aforesaid adjustment, to compensate for the different focal length in different lenses, consists of the slot or guideway or slotted ways or guideways $s\ s$ which are respectively arranged parallel to the arms $n^3$ of the levers $n$ when in the "unity" position as aforesaid; and similar slotted ways or guideways $t\ t$ arranged parallel to the arms $n^1$ of the levers $n$ when the latter are in said unity position; the said slotted ways or guideways $s\ s$ being fixed to and carried by the carrier $b$ as shown, while the slotted ways or guideways $t\ t$ are fixed to and carried by the carrier $a$ as shown.

The pins or swivel eyes $q\ q$ are adapted to slide along in or upon the said slotted ways $s\ s$ and also are adapted to be clamped or otherwise secured in any position along same, and similarly with the pins or swivel eyes $p\ p$ on or in the slotted ways $t\ t$. Thus when a lens of different focal length is to be employed, the levers $n$ are first set to "unity" and then the pins or swivels $p\ p$ and $q\ q$ are unclamped or released from or upon the guide-ways $t\ t$ and $s\ s$; the carriers $a$ and $b$ are then adjusted (in either direction) along the base-board until the indicators $u^1$ and $v^1$ respectively show on the scales $u$ and $v$ the equivalent focus of the lens in question or (if this latter is not already known) until the two images appear the same size on the screens and the reading on the scales correspond; and thereupon the pins etc. $p$ and $q$ are clamped and secured in the position they now occupy on the slotted ways or guideways $t$ and $s$ and thereafter the apparatus will act automatically (as before) while such lens is continued to be used.

In the arrangement shown in Fig. 3 where the lever is controlled by a pin on a sleeve or cursor traversing along a screw, the practical measurements for the purposes of construction may be made as follows:—There is one constant, viz. the equivalent focus of the lens, and four variables, viz. (1) the inclination of the lever (2) the pitch of the screw (3) the circumference of the pinion, and (4) the distance of the axis of the screw from the pivot of the lever. The simplest method of showing how to determine the ratio of these factors is to take an example;—for instance let 6 inches be the equivalent focus of the lens, and let the inclination of the lever be measured in terms of the tangent of its angle of inclination with a line at right angles to the axis of the lens, (that is to say, the vertical distance B C compared to the horizontal distance A B, Fig. 1, or $\frac{BC}{AB}$ or as in Fig. 3 the ratio of the distance $b'\,g^2$ to the distance $g^2\,g^2$, that is to say $\frac{b'\,g^2}{g^2\,g^2} = \frac{1}{2}$; further, let three turns to the inch represent the pitch of the screw and one inch the pitch circumference of the pinion, it is now only necessary to determine the distance of the axis of the said pinion or screw from the pivot of the lever. As the lens carrier must move along the base-board six inches for each unit of enlargement; the pitch of the screw being three turns to the inch, the pinion must revolve three times to move the cursor one inch, that is to say a movement of six inches of the pinion along the rack will move the cursor two inches along the screw. And as already stated the ratio of the distance moved by the cursor for each unit of enlargement, to the distance of its path from the pivot of the lever, must equal the co-tangent of the angle of inclination of the lever. Hence, as the inclination of the lever (in this example) is $\frac{1}{2}$, the co-tangent of the angle equals $\frac{2}{1}$ and the distance of the axis of the screw from the pivot of the lever must be half the distance moved by the cursor for each unit of enlargement, that is to say one inch.

In the arrangement as shown in Figs. 4 5 and 6 the position of the points of attachment or connection of the levers to (i. e. the points where same act on) the negative and positive carriers may be determined as follows:—The levers and negative and positive carriers are placed in the position they are intended to occupy when the apparatus is at "unity". Then lines drawn on the bases of the negative and positive carriers at right angles to the axis of the lens, at distances equal to the equivalent focus of the lens from the line through the pivots of the levers will cut the center of the slots in the levers at the required points. This is clear by referring to Fig. 2 and the formula for the lengths of the front and back foci, for both the front focus and the back focus consist of a constant distance $f$ plus a variable distance $f \div n$ and $f \times n$, respectively. As the movement of the levers controls these variable distances, it is obvious that when at "unity" the two variable distances must each be equal to $f$, the equivalent focus of the lens—for at "unity" these distances should be $f \div 1$, and $f \times 1$, both of which are equal to $f$. The positions of the vertical planes or image bearing surfaces of the negative and positive carriers may be likewise determined by lines drawn at right angles to the axis of the lens at a distance from its optical center equal to twice the length of the equivalent focus of the lens.

In order to simplify the manufacture of the apparatus, as shown in Figs. 4, 5, 6, 7, and 8, and to permit the use of lenses of varying focal lengths in one and the same apparatus, it is desirable to add a special adjustment shown in Fig. 8 ($s\,s$, $t\,t$) consisting of slots or guide-ways in the bases of the negative and positive carriers. The length and positions of the said guide-ways $t\,t$, $s\,s$ may be determined as follows:—The position of the points where the levers act on the carriers for the lens of longest focal length which it is intended to use in the apparatus may be first found by the method before described. Now let lines be drawn from these points parallel to the arms of the opposite levers in a direction away from the lens. These lines will indicate the center of the slots of the required guide-ways $s\,s$, $t\,t$, and may be made of such a length that their terminals are as far away from the line drawn through the points where the levers act on the carriers as the difference between the longest and shortest focal lengths of lenses intended to be used in the apparatus. This will be understood when it is considered that for every difference of one inch less in the focal length of the lens to be used, the carriers must close in towards the lens a distance of two inches, see the formulæ for focal lengths; and also the points $p\,p$, $q\,q$, must be one inch nearer the lens. The net result of these two movements would be a displacement of the position of the points $p\,p$, $q\,q$ of one inch on the base of the negative and positive carriers, towards the image bearing surfaces of the respective carriers, and in a line parallel to the sides of the base board. But a reference to Fig. 2 will show that the lines B C, D E, must be displaced towards the pivot point A, if they are made shorter, in order to meet the lever arms A C, A M, and the base A B when the levers maintain their former position. The amount of this displacement varies according to the respective angle of inclination of the arms of the levers, and may be stated as $d \times \cot.\ \theta$, where $d$ equals the amount of shortening of the lines B C, D E, and $\theta$ equals the angle of inclination of the respective arms of the lever with the base A B. Hence as the points $p\,p$, $q\,q$, Fig. 6, correspond with the points C and E, respectively, Fig. 2, therefore the points $p\,p$, $q\,q$ must be displaced on the base of the positive and negative carriers in lines at right angles to the sides of the base board, and in the direction of the pivots of their respective levers. The net result of the above two displacements of the points $p\,p, q\,q$, would therefore be in the direction of the diagonal of a rectangle measuring one inch on the side parallel to the sides of the base board, and one inch multiplied by the cotangent of the angle of inclination of the respective arms of the levers, on the side at right angles to the sides of the base board. These diagonals are as stated parallel to the respective arms of the opposite levers. A reference to Fig. 8 will make this clear.

The above described means of adjustment facilitates the construction of a large number of apparatus to the same model and measurements, and enables them to be fitted subsequently with lenses of varying focal lengths. For this purpose it is only necessary to place the levers in the position they are intended to occupy when the apparatus is at unity and to set the vertical planes of the negative and positive carriers at a distance respectively from the optical center of the lens equal to twice its equivalent focus, since from the formula for focal lengths, the length of the front focus must equal $f$ plus $f \div l$, and the back focus must equal $f$ plus $f \times l$, when the images are of the same size, that is to say, in each case a distance equal to twice the equivalent focus of the lens. The axis of each arm of the lever will then intersect the center of its respective adjusting guide-way at the point required for the reception of the pivotal studs $p$ and $q$. These studs may then be permanently fixed or temporarily clamped in position on the bases of the positive and negative carriers.

To facilitate the adjustment of the distance of the vertical planes of the positive and negative carriers from the optical center of the lens, index marks or an indicator $u^1 v^1$ may be placed on the carriers, and scales $u\,v$ attached to the base-board e. g. as shown in Fig. 8.

It is advantageous for the levers to be symmetrical to facilitate ease of construction and smooth working of the apparatus; and the levers may be of any desired shape, provided the lines which respectively join the pivot point of the lever and the point of its attachment to (or where it acts on) the negative and positive carriers, always meet at right angles to one another at the pivot of said lever.

If desired instead of fixing the levers in or near the plane of the base-board of the apparatus they may be affixed to the top or sides of the apparatus, as for instance a lever on each side of the apparatus working in a vertical plane parallel to the axis of the lens.

For purposes of description the term "negative carrier" has been applied to that component of the apparatus which carries the copy when an enlargement is to be made, and the term "positive carrier" has been applied to the component carrying the enlargement; but it will be readily understood that the apparatus may be used vice-versa, and a reduced picture made from a larger copy, by simply turning the apparatus end for end with regard to the source of illumination, and placing the plate or paper to be exposed and the picture to be copied in the suitable respective carriers.

In place of studs working in feather ways on the levers, any suitable mechanical equivalents may be adopted, as for instance the arms of the levers may work in sleeves pivoted to the carriers, or between anti-friction rollers, pivoted to the carriers; and in the latter case the rollers at each point of attachment should be coupled together, and have one common pivot so that they adjust themselves according to the angle the lever makes with the carrier to which it is attached.

In the practical construction of this apparatus it is immaterial whether the vertical plane through the optical center of the lens, passes through the line joining the pivots of the levers or not, but it is necessary that the distance of the points of attachment of the levers to the negative and positive carriers from the line through the pivots of the levers should each be equal to the equivalent focus of the lens when the apparatus is at unity and therefore the distance between the points of attachment of the levers to the negative carrier, from the point of attachment of the respective levers to the positive carrier must be twice the equivalent focus of the lens.

Should the vertical plane through the optical center of the lens not coincide with the line joining the pivots of the levers, the distances of the vertical planes of the negative holder, and positive holder from the points of attachment must be adjusted so that at unity the total distance between these planes must be equal to four times the focal length of the lens, and each of these planes must respectively be distant from the optical center of the lens twice the equivalent focus of the lens. For instance (see Fig. 6), the lines $o\,o$, $p\,p$, and $q\,q$ may be shifted backwards or forwards in constructing the apparatus, as convenient, anywhere between the vertical planes or surfaces carrying the images on the carriers $a$ and $b$, provided always that the relative distances between these lines is preserved; and it follows that as the line $q\,q$ approaches the negative carrier, by so much must the line $p\,p$ recede from the positive carrier, and the bases of these carriers must be lengthened or shortened accordingly.

A reference to the drawings will show that in the various arrangements illustrated the following points are common to all viz:—
(1) A lever having a pivot fixed in relation to the lens. (2) Two points of control acting in conjunction with the lever; viz. one (directly or indirectly) connected with or arranged to act on each image carrier. (3) The distances of these points of control from the pivot of the lever are variable, and the ratio of the said distances varies directly as the ratio of the size of the images on the respective carriers. (4) The mechanism which connects the lens support, the image support and the object support, compels two of them to move according to a predetermined formula, so that any adjustments of the said supports by said mechanism may be made with an accuracy and speed that is not attainable by any of the mechanisms heretofore proposed.

What I claim is:—

1. In a photographic enlarging and reducing apparatus, the combination of a positive carrier, a lens and a negative carrier, one of these three members being fixed and the other two being movable in relation thereto, connections thereby the movement of one of the movable members will cause the movement of the other movable member a distance so that the proper focal lengths on each side of the lens will be maintained, and means for adjusting these parts relatively to each other so that lenses of different focal lengths may be used, substantially as described.

2. In a photographic enlarging or reducing apparatus, the combination of a positive carrier, a negative carrier, and a lens located at a point between said carriers, two of said members being movable and the remaining member being fixed, connections whereby the movement of either of the movable members will automatically cause the movement of the other member in such a manner as to automatically maintain said carriers at the proper and corresponding distances from said lens, and means for adjusting said members so that lenses of different powers may be used, substantially as described.

3. In a photographic enlarging or reducing apparatus, the combination of a base board, a lens mounted thereon, a positive carrier located on one side of said lens and a negative carrier located on the other side of said lens, connections whereby the movement of either of said carriers will automatically cause the movement of the other carrier so that the proper distances of the carriers from the lens will always be maintained, said connections including slotted right angled levers pivoted substantially in line with said lens, said slotted levers engaging pins whereby the movement of said levers will operate said carriers, and means for adjusting said levers so as to adjust the distances of said carriers relatively to said lens, whereby lenses of different powers may be used, substantially as described.

4. In a photographic enlarging and reducing apparatus, the combination of a base board, a lens supported thereby, positive and negative carriers, slidably mounted on said base board, bellows connecting said carriers respectively with said lens, means whereby the movement of one of said carriers will cause the movement of the other carrier such a distance as to preserve the proper focal distances of the carriers from the lens, consisting of right angled slotted levers pivoted substantially in line with said lens, and pins attached to the carriers and operated by the movement of the respective arms of said levers, and means for adjusting the points of operative connection of said levers with said carriers, whereby lenses of different powers may be used, substantially as described.

5. In a photographic enlarging and reducing apparatus, the combination of a base board, a lens fixed thereon, a positive carrier on one side of said lens and a negative carrier on the other side of said lens, bellows respectively connecting said carriers with said lens, a scale for each of said carriers, means whereby the movement of one of said carriers will cause a corresponding movement of the other carrier so as to always preserve the proper focal distances from the lens, said means consisting of slotted right angled levers pivoted to said base board substantially in line with said lens, pins or studs carried by said carriers respectively for engaging the slots in the respective arms of said levers, and means for adjusting said pins so that lenses of different powers may be used consisting of sliding guideways on said base board, and set screws, substantially as described.

6. In a photographic enlarging and reducing apparatus, the combination of a base board, a lens mounted thereon, a positive carrier on one side of said lens, and a negative carrier on the other side of said lens, both slidably mounted on said base board, connections whereby the movement of one of said carriers will cause the movement of the other of said carriers to preserve the proper relative distances of said carriers from said lens, said connections including a pair of slotted right angled levers with their angles facing each other pivoted to said base board, and pins or studs engaging the slots in the arms of said levers, so that the movement of said levers will move said carriers, and means for adjusting said connections, substantially as described.

7. The combination with a photographic camera, comprising a lens support, an image support and an object support, and ways adapted to guide two of said supports with relation to the third, of a pintle or pintle bearing mounted on each one of the said supports and extending in a direction perpendicular to the direction of motion in the said ways, and means for adjusting two of said pintles or pintle bearings or their respective frames in the direction of the said ways.

8. The combination with a photographic camera comprising a lens support, an image support and an object support, and ways adapted to guide two of said supports with relation to the third, mechanism for connecting the said three supports to compel two of them to move with relation to the third in accordance with a predetermined formula whereby the proper focal lengths on each side of the lens will be maintained, pintles, or pintle bearings connected to said supports, and means for permitting the adjustment of two of said pintles or pintle bearings or the said supports in the direction of said slide ways, substantially as described.

In witness whereof I have hereunto set my hand in presence of two witnesses.

HENRY REX COOK.

Witnesses:
FREDK. L. RANDS,
H. D. JAMESON.